May 5, 1959 E. G. HEYL ET AL 2,885,105
PREFORMED SHRINKABLE CLOSURES FOR CONTAINERS
Filed Aug. 30, 1955 2 Sheets-Sheet 1

INVENTORS
EDGAR G. HEYL
JOSEPH J. HITOV

BY Cushman, Darby & Cushman
ATTORNEYS

May 5, 1959 E. G. HEYL ET AL 2,885,105
PREFORMED SHRINKABLE CLOSURES FOR CONTAINERS
Filed Aug. 30, 1955 2 Sheets-Sheet 2

INVENTORS
EDGAR G. HEYL
JOSEPH J. HITOV

BY *Cushman, Darby & Cushman*
ATTORNEYS

2,885,105

Patented May 5, 1959

2,885,105

PREFORMED SHRINKABLE CLOSURES FOR CONTAINERS

Edgar G. Heyl and Joseph J. Hitov, Baltimore, Md., assignors, by mesne assignments, to W. R. Grace & Co., Cambridge, Mass., a corporation of Connecticut Application August 30, 1955, Serial No. 531,566

5 Claims. (Cl. 215—38)

This application is related to copending application Serial No. 505,415, filed May 2, 1955, the entire disclosure of which is incorporated by reference.

This invention relates to a closure for bottles, jars, cans and similar types of containers usually made of glass, plastic, metal or fiber.

The closure is useful in sealing containers having a finish or capping area suitable for receiving and retaining "crown," lug, screw, or pressed-on types of caps.

The principal object of this invention is to provide a closure made of heat-shrinkable plastic, which will produce a seal conforming to the sealing surface or area of the container.

Another important object is to provide a means of preforming a closure from a heat-shrinkable linear condensation polymer, preferably, polyethylene terephthalate.

An equally important object is to preform a closure from a heat-shrinkable linear condensation polymer wherein the central portion of the closure is substantially non-shrinkable and the skirt portion is shrinkable.

A further object is to prepare a closure from a laminate of a heat-shrinkable linear condensation polymer, preferably, polyethylene terephthalate, and another heat shrinkable polymer, preferably, a polymer of an ethylenically unsaturated compound. If the latter is on the inside of the closure, better sealing characteristics are ensured.

Shrinkable closures are known, but the types prepared to date have objections which have somewhat mitigated against their commercial use.

It has been found that certain of the heat-shrinkable linear condensation polymers of high molecular weight have good sealing qualities and are applicable as closures. For instance, closures made of such polymers will shrink rapidly under moderate heat to a substantially unshrinkable state. Particularly, the plastic has a high melting point so that containers which have been filled with products which are subsequently to be heat-treated, namely, cooked or sterilized, may have a closure of a material which will withstand temperatures up to 240° C. or higher for extended time periods, whereby the contents may be heat-treated after filling without disturbing the sealing of the container. Such plastic materials also are tough, have a high tensile strength, as well as a high impact strength, high bursting strength and high tear strength and break elongation. This is important where sterilization is conducted in the container or other heat treatment applied which would generate a high pressure as, for example, when pressure beverages, such as beer, are pasteurized in the container after sealing, e.g., by heating to about 145° F. Equally important is the low gas and moisture vapor transmission quality of the plastic materials, whereby it is possible to maintain carbonated beverages, for example, with their initial high state of carbonation, so that they will not ultimately become flat and unsalable. Again, closures of the plastic materials possess high abrasion resistance and are transparent in the thicknesses employed, namely, about 2 to 10 mils, preferably 5 mils, and, in addition, are capable of being nicely printed upon and decorated. We find that the shrinkable plastics are inert and non-toxic to foods and beverages and medicines to such an extent, that this invention may be widely used for the bottling or packaging of such articles in sealed containers. In addition to the foregoing advantages, since the shrinkable material of the films from which the closures are formed usually do not require any plasticizer, the closures are not subject to degradation with time.

The closures of the present invention are preferably formed of Terylene, as disclosed in the patent to Whinfield, 2,465,319, and commercially termed "Mylar," as made and sold by E. I. du Pont de Nemours & Co., which plastic has been modified to render it shrinkable, as disclosed in the patent to Swallow, 2,497,376, and resists temperatures up to 240° C. and higher. The Whinfield and Swallow patents are hereby incorporated in their entirety into this disclosure.

The Terylenes described in the Swallow patent are preferred, namely, the shrinkable polymers of an ester of terephthalic acid and a glycol having 2 to 10 carbon atoms, and especially desirable is polyethylene terephthalate, which has, surprisingly, good sealing qualities and applicability as a closure, by reason of possessing all of the aforesaid properties.

Other heat-shrinkable linear condensation polymers of high molecular weight, which are useful and equivalents, are the stretched, i.e., preferably, bilaterally stretched synthetic linear polyamides of the class known as nylon, e.g., polyhexamethylene adipamide and sebacamide, the polymer of epsilon caprolactam, as well as the polyamides and polyesters disclosed in Carothers Patent No. 2,071,250, the entire disclosure of which is here incorporated by reference into this application, and linear polyurethanes made, for example, by condensing a diisocyanate with a dihydric alcohol, e.g., the condensation product of toluene diisocyanate with ethylene glycol.

There can also be employed other heat shrinkable linear polymeric esters, such as those obtained by condensing a dihydric alcohol, e.g., ethylene glycol or diethylene glycol, with other aliphatic and aromatic dicarboxylic acids, e.g., isophthalic acid, diphenic acid, stilbene dicarboxylic acid, tolane dicarboxylic acid, dibenzyl dicarboxylic acid, succinic acid, etc.

As previously stated, the preferred type of heat shrinkable linear polymer is polyethylene terephthalate, e.g., Mylar.

It has been found that, when a film of shrinkable polyethylene terephthalate is held under enough tension, it will not shrink when subjected to the usual shrinking temperatures. When the film is under no tension, it will shrink to the maximum amount at the proper temperature, but by controlling the amount of tension, the degree of shrinking can be controlled.

It has also been found that heat shrinkable Mylar shrinks most rapidly at 100° C., but that it will shrink at temperatures as low as 70° C. However, the rate of shrinkage at the lower temperature is slower than at the higher temperature, and this fact can also be used to advantage in that the shrinkage can be more readily controlled and can even be stopped at a desired point, e.g., 50%, by rapid cooling.

It has further been found that the regular non-shrinkable type of film can be used for producing the same type of closure by a control of the forming method. Accordingly, this invention also deals with a method of preforming a closure from a film of a linear condensation polymer of high molecular weight, preferably, polyethylene terephthalate, by the controlled stretching of parts of the closure during the forming operation.

It has been found that polyethylene terephthalate, for example Mylar, can be stretched by application of tension, increases of 75% in length being readily reached. Increases up ot 130%, or even higher, are possible, although it is not normally necessary to stretch to this extent to form closures according to the present invention. Since the yield point of this Mylar film is 5 to 6%, as long as this is exceeded in stretching, the film will remain stretched after tension is removed. If this value is not exceeded, the film will contract to its original size after the tension is removed. Accordingly, the stretching should be carried out to an extent which exceeds the yield point. It has been found, moreover, that a film stretched in excess of the yield point will contract rapidly upon being subjected to elevated temperatures, e.g., 100° C., or more slowly at a temperature of about 70° C.

In accordance with the invention, there is formed a one piece closure in the form of a disc of the unstretched film and the edge of the disc is then stretched to form the skirt of the closure.

Specifically, this is carried out by a drawing or stamping operation, done at ambient temperature or at a temperature below that at which the shrinking of the closure on the container will be carried out.

The preformed closure can be made with its inside dimensions substantially the same size as the outside dimensions of the container mouth to which it is to be applied, or larger. The shape of the closure is not limited to that shown in the specific examples, but can be varied, as will be recognized by those skilled in the art.

The preformed closure can then be applied to the container mouth and heat applied to shrink the stretched skirt in place. This operation is, preferably, carried out in accordance with the methods described in the aforementioned patent application, Serial No. 505,415.

If desired, the inside of the disc part of the closure can be lined with a suitable facing material, such as paper, or laminated with other material, as more fully set forth hereinafter, to provide a sealing surface, or a rubber or cork gasket, or an O-ring type of seal can be provided, although such is not always necessary. Also, the inner or outer surfaces of the closure may be printed or metallized for purposes of decoration.

This invention uses a film made of a linear condensation polymer of high molecular weight, part of which is stretched substantially beyond its yield point. Mylar is cited as a preferred example, but, as previously stated, the invention is not limited to this material. The properties of this type of film, which are advantageous, have been cited in the aforementioned patent application and they are equally of merit in this invention. In a like manner, the advantages cited for this type of closure still hold. However, since the central panel of the present closure does not shrink, it eliminates problems connected with the printing of a design or decoration on a material which will subsequently be shrunk. Another advantage lies in the fact that most printing inks require heat for drying and the non-shrinking film is well suited for this usage, e.g. the ink can be applied before the stretching step. For the same reason, a non-shrinking panel lends itself to the application of a lining material, laminate, gasket or other sealing means, which need not be shrinkable.

Referring to the drawings.

Figure 7:

Figure 7 is a sectional view, showing shrinkable polyethylene terephthalate laminated with another shrinkable plastic, such as dual oriented polyvinyl chloride, bi-axially oriented vinyl chloride-acrylonitrile copolymer, bi-axially oriented polyethylene or bi-axially oriented polystyrene, the layers being united in any suitable manner, for instance, by means of an adhesive, such as an epoxy resin, e.g., a bis-phenol A-epichlorhydrin resin, see Patents Nos. 2,500,449 and 2,500,600, for details of making such adhesive resins. The second shrinkable plastic is, preferably, a polymer of an ethyleneically unsaturated monomer. Unless otherwise stated, the term "polymer" in the claims is intended to include copolymers as well as homopolymers.

Figure 8:

Figure 8 is a sectional view, showing a preformed closure having a stretched skirt and a non-shrinkable central panel, together with a non-shrinking sealing liner therefor, made of rubber, cork, paper, plastic, e.g., a vinyl chloride resin, plastisol, polyethylene, etc.

Figure 9:
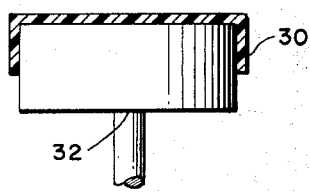

Figure 9 is a sectional view of another form of the invention, illustrating forming the closure preform by draping heat-shrinkable polyethylene terephthalate around a male die.

Figure 10:
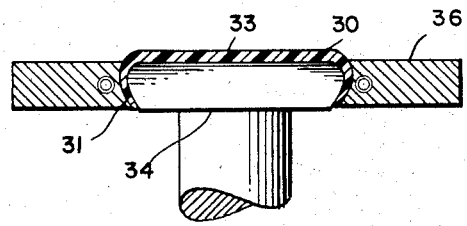

Figure 10 is a sectional view, similar to Figure 9, showing the application of clamping means to form the skirt.

Figure 11:
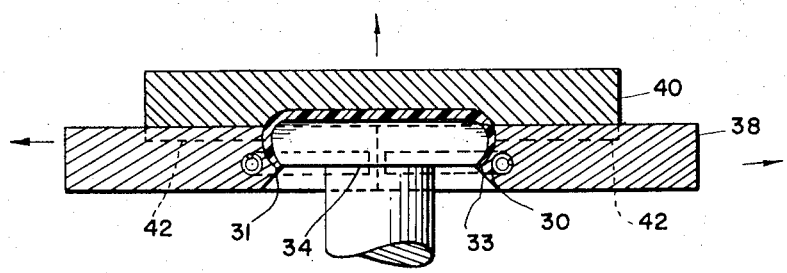

Figure 11 is a sectional view, showing preparing the closure preform by cold forming in a male-female die.

Figure 1:
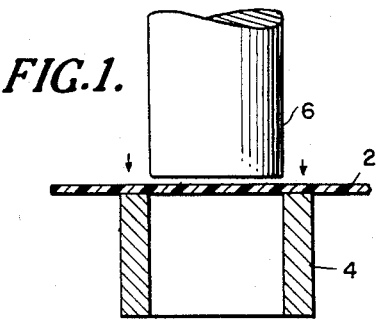
Figure 1 is a sectional view showing a two-part die and a film of linear condensation polymer, specifically polyethylene terephthalate, prior to the preforming operation.
Figure 2:
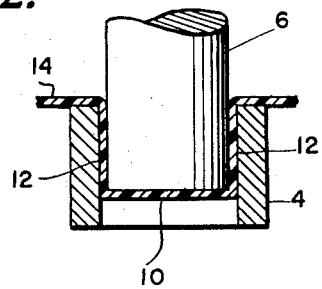
Figure 2 is a sectional view similar to Figure 1, showing the preforming operation.
Figure 3:
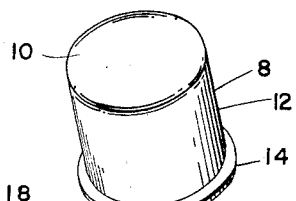
Figure 3 is a perspective view showing the preformed cap or closure made in Figure 2.

In carrying out the invention, as illustrated in Figures 1 to 3, a sheet of non-shrinkable polyethylene terephthalate film 2, of thickness 2 to 10 mils, e.g., 4 mils, is held tightly over the female die 4. (The direction of application of the pressure is indicated by the arrows.) The plunger or male die 6, which is of slightly narrower diameter than the internal diameter of the die 4, is then forcibly inserted in the die 4. This forces a portion of the sheet down to form the closure 8, comprising a central disc 10 and a peripheral skirt 12. The skirt 12 is stretched by the action of the plunger, while the central disc 10 remains substantially unstretched. In the specific example, shown in Figures 1 to 3, the skirt portion is preferably stretched more than 10%, e.g., 20%. The stretching of the skirt can be accomplished by conventional metal stamping technique. The formed closure can be cut from the sheet of film in conventional manner. If desired, a circular flange 14 can be allowed to remain at the bottom of the skirt, as shown in Figure 3. This flange aids in the removal of a cap from a bottle or other container, as is clear from a consideration of Figure 6.

It will be evident to those skilled in the art that the skirt of the container can be stretched in other ways. Thus, a disc could be cut from a sheet of polyethylene terephthalate film, a cylindrical skirt formed, and then the skirt stretched by inserting the skirted disc into a die 4, as in Figure 2, and the plunger 6 forced upon the skirted disc to stretch the skirt.

Figure 4:
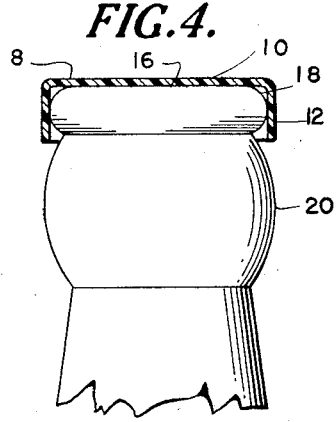
Figure 4 is a sectional view showing the manner in which the preformed closure or cap is applied over the lip and mouth of a container, e.g., a bottle. The closure in Figure 4 does not have a lower flange.
Figure 5:
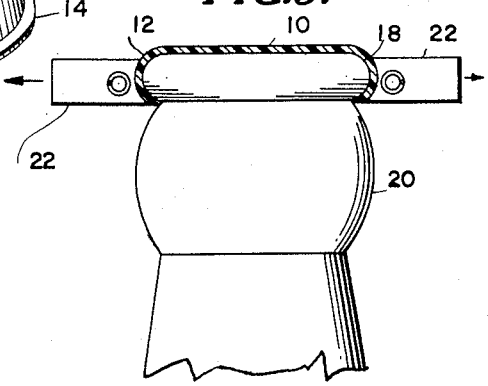
Figure 5 is a sectional view similar to Figure 4, showing an optional form of the invention, wherein forming means are applied to aid in making the closure conform more closely to the top of the container.
Figure 6:
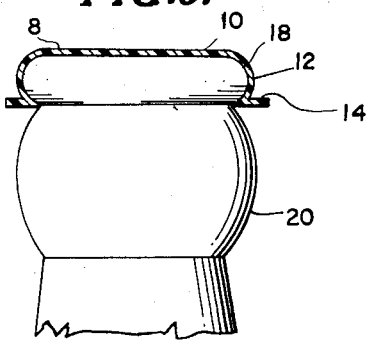
Figure 6 is a sectional view similar to Figure 4, showing the closure closely conforming to the sealing lip of the container. The closure in Figure 6 has a lower flange to aid in removal of the closure from the container.

The closure 8 can then be applied over the mouth 16 and lip 18 of a bottle 20, as shown in Figure 4. (The closure in Figure 4 does not have the lower flange 14.) After the closure has been placed over the sealing lip 18 of the bottle, as in Figure 4, heat, e.g., a temperature of 100° C. can be applied to shrink the skirt so that it conforms to the sealing lip. Alternatively, the skirt can be made to conform more closely to the surfaces of the sealing lip 18 with the aid of movable dies 22 (Figure 5), prior to the heat shrinking of the skirt. As shown in Figure 6, the skirt 12 of closure 8, after heat shrinking, conforms to the contours of the sealing lip 18, while the flange 14 readily enables one to remove the closure from the bottle.

There may be applied to the closure, comprising the unstretched central disc 10 and stretched skirt 12, a liner of unstretched polyethylene 24, as shown in Figure 8. As previously indicated, other liners can be employed.

In that form of the invention wherein, rather than employing unstretched linear condensation polymer, there is used a stretched condensation polymer, it is possible to laminate to the stretched condensation polymer, e.g., polyethylene terephthalate, 26, a layer of a different polymer 28, which is correspondingly stretched, e.g., bilaterally oriented polyethylene, as shown in Figure 7. The two polymer layers can be united by any suitable adhesive, e.g., a bisphenol A-epichlorhydrin resin.

Figures 9 to 11 further illustrate the use of heat-shrinking linear condensation polymers, e.g., heat-shrinking polyethylene terephthalate. As shown in Figure 9, heat-shrinking polyethylene terephthalate film 30 is draped around male die 32. The polyethylene terephthalate can then be partially heat-shrunk around the die 32. The die 32 can have substantially vertical sides, as shown in Figure 9, or, instead, there can be employed a male die 34, as in Figures 10 and 11, in which the sides have the same contours as the conventional sealing lip of a bottle, for example. Such sealing lips are generally somewhat elliptical. When employing a male die 34, as in Figure 10, it is desirable to also use an external die 36 in the form of a pair of semi-circular rings to clamp around the skirt 31 of the preformed closure 33 formed from the film 30, in order to make the skirt conform to the surface of the die 34. The film is then subjected to heat, in order to partially shrink the same. Thus, the polyethylene terephthalate film employed in the processes described in connection with Figures 9 to 11, may be of a type which can shrink up to 5% and can be partially shrunk at 70° C. in forming the preform.

Instead of partially shrinking the shrinkable polymer to prepare the preformed closure, it is possible to preform by a cold forming process, in which there need be no shrinking. This can be accomplished, as is illustrated in Figure 11, by using both a lower exterior die 38 and an upper exterior die 40, in addition to the interior die or mold 34. In operation of the apparatus in Figure 11, after the polyethylene terephthalate film 30 is draped around the interior mold 34, the lower die member 38 first strikes the film 30 to fold it, whereupon the upper die member 40 engages the film to accelerate and control this fold and to also make the polymer film conform to the top exterior surface of the interior mold 34. The lower die members 38 are in the form of a pair of semicircular rings, slidably movable in grooves 42 in the bottom of the block or die 40, so that, when the block has reached the position shown in Figure 11, these ring members move inwardly to complete the conforming of the preformed closure to the die 34.

The die 34 in Figures 10 and 11 can be removed from the preformed closure in any suitable manner. Thus, due to the springiness of the plastic material of the closure, it is possible to merely pull out the die 34. Alternatively, the die 34 can be of a collapsible type and can be collapsed to aid in its removal. In this case, as the die is removed, the preformed closure can be allowed to fall to a table (not shown), having openings therein large enough to permit the collapsed die to go through, but small enough to prevent the preformed closure from going through.

As previously stated, the preformed closure can be made in the form of the standard crown shell having a fluted skirt, or in any other form desired. In size, the preformed closure can be made with its inside dimensions substantially the same as, or larger than, the outside dimensions of the container mouth to be sealed. Thus, the preformed closure may be snug enough to snap on over the closure mouth sealing ring or lip, or it can be relatively loose when applied. In either event, the closure will shrink tightly over the container mouth, forming the seal upon heating, e.g., to 100° C., in the manner taught in application, Serial No. 505,415, filed May 2, 1955.

We claim:
1. A method of preforming a closure having a central portion and a skirt for bottles, jars, cans and similar containers from a heat shrinkable linear condensation polymer, comprising placing a sheet of said polymer over female forming means, forcing a disc-like portion of said sheet into said female forming means with the aid of male forming means, the edges of said disc being substantially stretched thereby and the central portion of the disc remaining substantially unstretched.

2. The method according to claim 1, wherein the polymer is polyethylene terephthalate.

3. A closure having a central portion and a skirt for bottles, jars, cans and similar containers, said closure being formed from a linear condensation polymer, the skirt of said closure being in a form of said polymer which is heat shrinkable and the central portion of said closure being in a form of said polymer which is substantially non-heat shrinkable.

4. A closure according to claim 3, wherein said polymer is polyethylene terephthalate.

5. A method of preforming a closure having a central portion and a skirt for bottles, jars, cans and similar containers from a heat shrinkable polymer, comprising placing a sheet of said polymer over female forming means, forcing a disc-like portion of said sheet into said female forming means with the aid of male forming means, the edges of said disc being substantially stretched thereby and the central portion of the disc remaining substantially unstretched.

References Cited in the file of this patent

UNITED STATES PATENTS

| | | |
|---|---|---|
| 1,615,504 | Cohoe | Jan. 25, 1927 |
| 2,072,536 | Trickey et al. | Mar. 2, 1937 |
| 2,238,681 | Darough | Apr. 15, 1941 |
| 2,338,787 | Vshakoff | Jan. 11, 1944 |
| 2,447,983 | Little | Aug. 24, 1948 |
| 2,497,376 | Swallow | Feb. 14, 1950 |
| 2,669,369 | Towns | Feb. 16, 1954 |
| 2,679,969 | Richter | June 1, 1954 |

FOREIGN PATENTS

| | | |
|---|---|---|
| 468,762 | Great Britain | July 12, 1937 |